Oct. 4, 1960 R. N. JANEWAY 2,954,835
UNDERSTEERING REAR SUSPENSION
Filed Sept. 3, 1957
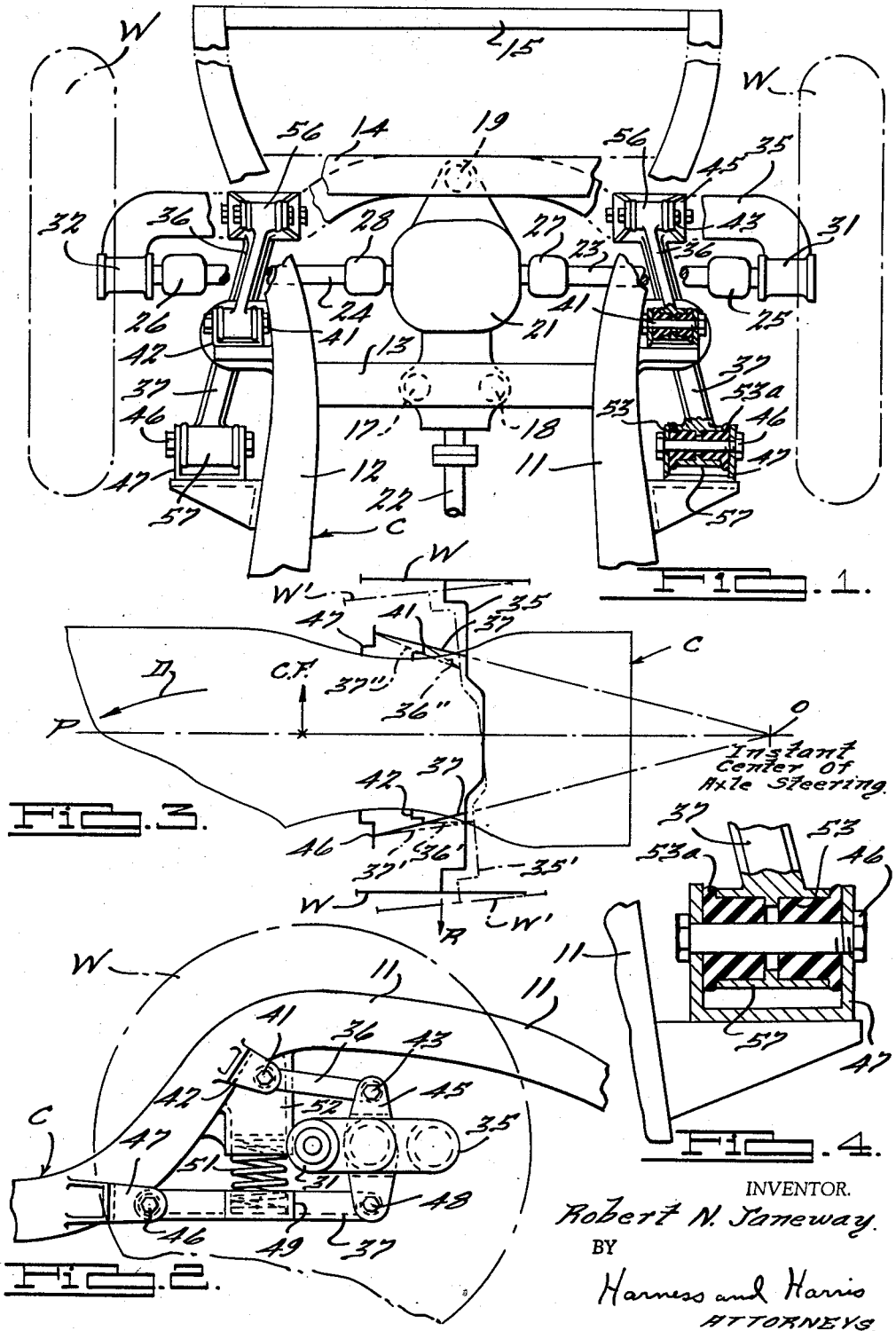
INVENTOR.
Robert N. Janeway
BY
Harness and Harris
ATTORNEYS.

United States Patent Office 2,954,835
Patented Oct. 4, 1960

2,954,835

UNDERSTEERING REAR SUSPENSION

Robert N. Janeway, Detroit, Mich., assignor to Chrysler Corporation, Highland Park, Mich., a corporation of Delaware Filed Sept. 3, 1957, Ser. No. 681,703

11 Claims. (Cl. 180—73)

This invention relates to vehicle axle suspensions and is particularly concerned with a practical arrangement for incorporating centrifugal force actuated rear wheel understeer in a De Dion-type rear axle construction.

It is a primary object of this invention to provide a linkage arrangement for support and control of the rigid road wheel supporting axle of a De Dion-type vehicle suspension wherein centrifugal force induced movement of the wheel axle relative to the chassis frame automatically provides a predetermined degree of understeer that improves vehicle handling.

It is still another object of this invention to describe a new principle of corrective rear wheel steering in which the steering effect is coupled directly to the lateral force imposed on the rear wheels as a reaction to the centrifugal force acting on the vehicle.

It is still another object of this invention to provide a suspension arrangement having an inherent rear wheel understeering action that will respond directly to the forces which make this corrective understeering necessary and that uncouples the rear wheel steering action from independent vertical motions of the rear wheels with respect to the vehicle body.

It is a further object of this invention to provide a resiliently mounted, converging link, dead axle support wherein the moment produced by lateral force reaction on the wheels will result in a simultaneous lateral displacement of the wheels and axle assembly and its rotation about a vertical axis such that a predetermined degree of corrective vehicle understeer is developed. Accordingly, in traversing a curve the centrifugal force acting on the vehicle will produce an inclination of the rear wheel dead axle relative to the chassis frame, by rotation thereof about a vertical axis, tending to steer the vehicle out of the curve. This condition is generally defined as "understeer." Because of this "understeer" effect the vehicle operator exerts a continuous turning effort during traverse of a curve, rather than an on and off turning effort, and vehicle control is improved.

It is still another object of this invention to provide a trailing arm De Dion-type rear suspension that will provide an understeering rear end without the benefit of body roll.

It is still another object of this invention to provide a rear wheel trailing arm De Dion-type suspension using rearwardly converging, resiliently mounted, link arms that inherently react to the centrifugal force applied to the vehicle such that the arms are forced to assume an angularity relative to the chassis frame in the right direction to develop corrective understeer as a result of relative lateral displacement of the wheels with respect to the vehicle chassis under centrifugal force action.

Other objects and advantages of this invention will become readily apparent from a reading of the following description and a consideration of the related drawings wherein:

Fig. 1 is a fragmentary top plan view of the rear end of a vehicle chassis frame having a De Dion-type wheel axle suspension embodying this invention;

Fig. 2 is a side elevational view of the rear end suspension shown in Fig. 1;

Fig. 3 is a diagrammatic plan view corresponding to Fig. 1 that shows the effect of centrifugal force on the link supported rear axle when traversing a curve; and Fig. 4 is an enlarged fragmentary view of a link end pivot.

In Fig. 1 is shown the rear end of a chassis frame C that includes side rails 11, 12 that are interconnected by several cross members 13, 14 and 15. Fixedly mounted on the cross members 13, 14 by means of an insulated, three-point, mounting 17, 18, 19 is a sprung differential unit 21. Differential unit 21 is adapted to transmit drive from the engine driven propeller shaft 22 to the pair of driving wheel axles 23, 24 in conventional manner. Universal joints 25 and 26 connect the driving wheel axles 23 and 24 respectively to the road wheels W, W. Universal joints 27, 28 connect the driving axles 23 and 24 respectively to the side gears (not shown) of the sprung differential unit 21.

The road wheels W, W and their driving axles are journalled on the bearings 31, 32 of the dead axle 35. Dead axle 35 extends transversely of the chassis frame C and has a rearwardly bent central portion to avoid contact with the differential unit during relative vertical movement between the wheels W, W and the chassis frame C. From Figs. 1 and 2 it will be noted that the dead axle 35 is pivotally connected to the chassis frame C by two pair of trailing arm, rearwardly converging, superimposed, links 36, 36 and 37, 37. These links 36 and 37 are symmetrically arranged on the chassis frame so that their point of convergence O (Fig. 3) is along the longitudinal centerline OP of the chassis frame C.

It will be noted that the front ends of the upper links 36 are pivotally connected to horizontally extending pivot pins 41 carried by brackets 42 formed on the chassis frame side rails 11, 12. The rear ends of each of the upper links 36 are pivotally connected to pivot pins 43 carried by the brackets 45 that are fixedly mounted on opposite ends of the dead axle 35. Likewise, the front ends of the lower links 37 are pivotally connected to pivot pins 46 carried by brackets 47 formed on the side rails 11, 12. The rear ends of the lower links 37 are pivotally connected to the dead axle mounted brackets 45 by pivot pins 48. The lower links 37, at a point intermediate their ends, are each formed with a spring receiving seat 49 that is adapted to receive the lower end of a coil spring, air spring, or similar resilient element 51. The chassis frame side rails 11, 12 carry spring seats 52 that overlie the lower link seats 49 and receive the upper ends of the spring elements 51.

From a consideration of Fig. 1 it will be noted that the ends of each of the links 36, 37 are connected to their associated pivot pins by means of rubber or rubber-like bushings 53. The resilient bushings 53 at opposite ends of the links are similar and these bushings are of the type commonly referred to in the automotive industry as Harris bushings. The resilient sleeve-like bushings 53 are compressed into place in their mountings so that there are formed end flanges 53a that resist axial displacement of the link ends along their pivot pins as well as radially of their pins. Rotation or circumferential movement of the link ends about their pivot pins can take place due to torsional shear of the resilient bushings. The torsional shear of the resilient bushings offers low resistance to link rotation about their pivot pins and prevents abrading of the resilient sleeves 53.

Due to the relatively long, sleeve-like, bosses 56, 57 on the ends of the links 36, 37 that receive the resilient bushings 53, rotation of the links 36, 37 about vertical axes must overcome a considerable resistance to deformation of the resilient material 53 in a radial direction as well as compression of the end flanges 53a. This resistance to deformation will be the same in the resilient bushings 53 at both ends of the links 36, 37 and the combined stiffness of the four pivot mountings for the four links 36, 37 is proportioned to give the desired degree of angular rotation about the respective vertical axes for a given centrifugal force CF acting on the chassis frame C.

The upper links 36 are required in addition to the lower links 37 so as to stabilize the wheel and axle assembly under vertical and longitudinal forces. As shown in Figs. 1 and 3, the short upper links 36 normally lie in the same vertical planes as the lower links 37. The upper links 36 are pivotally connected to the axle brackets 45 above the wheel axle 35 whereas the lower links 37 are pivotally connected to the brackets 45 below the axle 35. The geometry of the axle supporting linkage 36, 37 is such that both the upper and the lower links 36, 37 will tend to produce the same angular movement of the axle 35 about a vertical axis for a given lateral displacement of the frame C with respect to the wheels W, W under the influence of the centrifugal force CF.

It will be noted that the axes of the lower link bosses 56, 57 are parallel to the axle 35 and lie in the same horizontal plane in order to avoid steering effects being introduced by vertical displacement of the rear wheels W, W. Likewise, the upper links 36, 36 are preferably proportioned to give either a neutral effect or a slight degree of understeer under car body roll.

Now considering Fig. 3 particularly, it will be noted that the full line position of the wheel axle 35 represents the position of this axle when the vehicle is traveling along a straight path where it is substantially free of the effects of centrifugal force. At this time the rear wheels do not exert a steering influence on the vehicle movement. If now the vehicle should turn into a curve such as is indicated by the arrow D then a centrifugal force such as the force CF can be considered to act on the vehicle body and chassis frame C. When force CF is acting on the frame C tending to urge it radially outwardly there is an opposing reaction force R at the contact points between the road wheels W, W and the roadway acting in the opposite direction tending to urge the wheels W, W radially inwardly. These opposing forces CF and R cause relative lateral displacement between the road wheels W, W and the chassis frame C such that the wheels W, W can be considered to have been pulled radially inwardly with respect to frame C. Movement of the wheels W, W radially inwardly will cause the links 36, 37 on the left side of the vehicle to be moved to the positions 36′, 37′ where they are at a reduced angularity with respect to the longitudinal centerline OP. This reduction in angularity of the left links tends to increase the effective length of these links as regards their connection to the axle 35.

At the same time that the left links are being effectively lengthened the right links are moved radially inwardly to the positions 36″ and 37″ such that their angularity with respect to the centerline OP is being increased. This increase in angularity of the right links 36, 37 tends to reduce their effective length with respect to their connection to axle 35.

Accordingly, as a result of the change in the effective length of the two pairs of axle supporting links, the axle 35 can be considered to be rotated about a vertical axis to the position 35′ so that the wheels W, W are now located at W′, W′ where they tend to steer the vehicle out of the curve. This tendency of the rear wheels W, W to steer the vehicle out of the curve D is what is known as rear wheel understeer.

In the suspension herein disclosed this corrective understeer is inherent because of the converging arrangement of the trailing links 36, 37 and their resilient or movable connections to the chassis frame C and the dead axle 35. It is thought to be apparent from the foregoing description that the degree or amount of understeer to be incorporated in a trailing arm suspension of the disclosed or similar type can be controlled by the angularity, dimensions and spacing of the converging trailing links and by the degree of resilience of the pivot mountings for the link ends.

I claim:

1. A vehicle rear wheel suspension comprising a frame, an axle extending transversely of said frame forwardly of the frame rear end and mounting wheels located at opposite sides of said frame, a pair of transversely spaced, symmetrically arranged, links having their forward ends pivotally mounted on said frame with the links arranged to extend longitudinally of said frame and to converge towards a point rearwardly of the rear end of said frame, the rear ends of said links being pivotally connected to said axle, said link ends being pivotally connected to said frame and to said axle for movement in substantially vertically extending planes and the several link end pivot connections including resilient means that will permit a limited lateral displacement between said axle and said chassis frame which cooperates with the rearwardly converging link geometry to effect axle angling about a vertical axis to provide rear wheel understeer when said frame is subjected to a centrifugal force.

2. A vehicle rear wheel suspension comprising a frame, an axle extending transversely of said frame forwardly of the frame rear end and mounting wheels located at opposite sides of said frame, a pair of transversely spaced, symmetrically arranged, links having their forward ends pivotally mounted on said frame with the links arranged to extend longitudinally of said frame and to converge towards a point rearwardly of the rear end of said frame, the rear end of said links being pivotally connected to said axle, said link ends being pivotally connected to said frame and to said axle for link movement in substantially vertically extending planes and the several link end pivot connections including resilient means that will permit a limited lateral displacement between said axle and said chassis frame which cooperates with the rearwardly converging link geometry to effect axle angling about a vertical axis to provide rear wheel understeer when said frame is subjected to a centrifugal force, and resilient means interconnecting said links and said frame to transmit vertical loads therebetween.

3. A vehicle rear wheel suspension comprising a frame, an axle extending transversely of said frame forwardly of the frame rear end and mounting wheels located at opposite sides of said frame, a pair of transversely spaced, symmetrically arranged, links having their forward ends pivotally mounted on said frame with the links arranged to extend longitudinally of said frame and to converge towards a point rearwardly of the rear end of said frame, the rear end of said links being pivotally connected to said axle, said link ends being pivotally connected to said frame and to said axle for link movement in substantially vertically extending planes and the several link end pivot connections including resilient means that will permit a limited lateral displacement between said axle and said chassis frame which cooperates with the rearwardly converging link geometry to effect axle angling about a vertical axis to provide rear wheel understeer when said frame is subjected to a centrifugal force, resilient means interconnecting said links and said frame to transmit vertical loads therebetween, and a drive transmitting differential mounted on said frame and drivingly connected to said wheels.

4. A vehicle rear wheel suspension comprising a frame, an axle extending transversely of said frame forwardly of the frame rear end and mounting wheels located at opposite sides of said frame, a pair of transversely spaced, symmetrically arranged, links extending longitudinally of said frame and converging towards a point rearwardly of the rear end of said frame, said links each having their opposite ends pivotally connected respectively to said frame and to said axle for movement in substantially vertically extending planes, the several link end pivot connections including resilient means that will permit a limited lateral displacement between said wheels and said chassis frame which cooperates with the rearwardly converging link geometry to effect axle angling about a vertical axis to provide rear wheel understeer when said frame is subjected to a centrifugal force, and additional linkage means having a similar rearwardly converging geometry interconnecting said axle and frame and arranged to stabilize the aforedescribed movements of said wheels with respect to said frame.

5. A vehicle rear wheel suspension comprising a frame, an axle extending transversely of said frame forwardly of the frame rear end and mounting wheels located at opposite sides of said frame, a pair of transversely spaced, symmetrically arranged, links extending longitudinally of said frame and converging towards a point rearwardly of the rear end of said frame, said links each having their opposite ends pivotally connected respectively to said frame and to said axle for movement in substantially vertically extending planes, the several link end pivot connections including resilient horizontally disposed, transversely extending sleeve-like link end bushings that will permit a limited lateral displacement between said wheels and said chassis frame which cooperates with the rearwardly converging link geometry to effect axle angling about a vertical axis to provide rear wheel understeer when said frame is subjected to a centrifugal force, and additional linkage means having a similar rearwardly converging geometry interconnecting said axle and frame and arranged to stabilize the aforedescribed movements of said wheels with respect to said frame.

6. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of links pivotally connected to each side of the chassis frame for rotation in substantially vertically extending planes, said links extending longitudinally of the frame and converging towards an instant center of rotation rearwardly of the rear end of said frame, means pivotally connecting the links to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subjected to a centrifugal force.

7. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of superimposed links at each side of the chassis frame having their forward ends pivotally connected to the frame for rotation in substantially vertically extending planes, said links being symmetrically arranged and extending longitudinally of the frame and converging towards an instant center of rotation rearwardly of the rear end of said frame, the rear end of said links being pivotally connected to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subject to a centrifugal force.

8. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of links at each side of the chassis frame having their forward ends pivotally connected to the frame for rotation in substantially vertically extending planes, said links extending longitudinally of the frame and converging towards an instant center of axle steering located rearwardly of the rear end of said frame, the rear end of said links being pivotally connected to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subjected to a centrifugal force, and other resilient means arranged between said axle and said frame to transmit loads therebetween.

9. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of links at each side of the chassis frame having their forward ends pivotally connected to the frame for rotation in substantially vertically extending planes, said links extending longitudinally of the frame and converging towards an instant center of axle steering located rearwardly of the rear end of said frame, the rear end of said links being pivotally connected to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subjected to a centrifugal force, said resilient means comprising resilient sleeves that permit vertical movement of the wheel supporting axle by torsional shear of the sleeves and resist lateral displacement of said wheels relative to said frame by compression of said sleeves.

10. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of links at each side of the chassis frame having their forward ends pivotally connected to the frame for rotation in substantially vertically extending planes, said links extending longitudinally of the frame and converging towards an instant center of axle steering located rearwardly of the rear end of said frame, the rear end of said links being pivotally connected to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subjected to a centrifugal force and resilient load supporting means connected between said links and said chassis frame.

11. In a vehicle, a rear wheel suspension comprising a chassis frame, a drive differential supported thereon, a dead axle extending transversely of said chassis frame forwardly of the frame rear end journaling road wheels arranged at opposite sides of the chassis frame, drive transmitting means connecting the differential and road wheels, a pair of links at each side of the chassis frame having their forward ends pivotally connected to the frame for rotation in substantially vertically extending planes, said links extending longitudinally of the frame and converging towards an instant center of axle steering located rearwardly of the rear end of said frame, the rear end of said links being pivotally connected to said dead axle for rotation relative thereto about substantially horizontal axes extending transversely of the chassis frame, one of each pair of links being arranged above said axle and the other of each pair of links being arranged below said axle, the several link pivotal connections including resilient means that permit limited relative lateral displacement between said wheels and said chassis frame which cooperates with the rearwardly converging link geometry to automatically effect axle angling about a vertical axis to provide rear wheel understeer when said frame is subjected to a centrifugal force, said pairs of links on each side of said chassis frame being arranged in the same vertical plane and located such that both the upper and lower links tend to produce the same angularity of the axle for a given lateral displacement of the wheels with respect to the frame.

References Cited in the file of this patent
UNITED STATES PATENTS

| | | |
|---|---|---|
| 2,300,844 | Olley | Nov. 3, 1942 |
| 2,373,356 | Thoms | Apr. 10, 1945 |
| 2,705,152 | Walter | Mar. 29, 1955 |
| 2,746,766 | Nallinger | May 22, 1956 |

FOREIGN PATENTS

| | | |
|---|---|---|
| 765,682 | Germany | June 22, 1953 |